(12) United States Patent
Sreenivas et al.

(10) Patent No.: US 10,044,255 B2
(45) Date of Patent: Aug. 7, 2018

(54) MULTIPHASE POWER SUPPLY AND PHASE CONTROL

(71) Applicant: Infineon Technologies Austria AG, Villach (AT)

(72) Inventors: Venkat Sreenivas, Winchester, MA (US); Amir Babazadeh, Laguna Hills, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/335,715

(22) Filed: Oct. 27, 2016

(65) Prior Publication Data

US 2018/0123443 A1    May 3, 2018

(51) Int. Cl.
| | | |
|---|---|---|
| *H02M 3/158* | (2006.01) | |
| *H02M 1/084* | (2006.01) | |
| *H02M 3/156* | (2006.01) | |
| *H02M 1/14* | (2006.01) | |
| *H02M 1/08* | (2006.01) | |

(52) U.S. Cl.
CPC ........... *H02M 1/084* (2013.01); *H02M 1/083* (2013.01); *H02M 1/14* (2013.01); *H02M 3/156* (2013.01); *H02M 3/158* (2013.01)

(58) Field of Classification Search
CPC ...... H02M 1/083; H02M 1/084; H02M 1/088; H02M 1/14; H02M 3/156; H02M 3/158; H02M 2003/156; H02M 2003/158
See application file for complete search history.

(56) References Cited

U.S. PATENT DOCUMENTS

| | | | | |
|---|---|---|---|---|
| 8,190,932 B2 * | 5/2012 | Rui | ..................... | H02M 3/1584 323/271 |
| 2011/0254526 A1 * | 10/2011 | Luo | ..................... | H02M 3/1584 323/284 |
| 2015/0115911 A1 | 4/2015 | Parto et al. | | |
| 2015/0364995 A1 * | 12/2015 | Chen | ..................... | H02M 3/158 323/271 |

* cited by examiner

*Primary Examiner* — Matthew Nguyen
(74) *Attorney, Agent, or Firm* — Chapin IP Law, LLC

(57) ABSTRACT

A multi-phase power supply circuit includes at least a first phase and a second phase (such as semi-resonant DC-DC power converter circuits), each of which output current to power a load. The first phase includes a first inductor device through which first current is delivered to the load. The second phase includes a second inductor device through which second current is delivered to the load. A current monitor circuit of the multi-phase power supply circuit is operable to monitor current through the second inductor device. Control circuitry of the multi-phase power supply circuit is operable to adjust timing of activating a control switch in the second phase to an ON state based on the monitored current. Timing of the phases is adjusted to achieve a common switching and zero current switching amongst the phases.

38 Claims, 15 Drawing Sheets

PHASE ADJUSTMENT INFORMATION
110

PHASE #1   MASTER PHASE
PHASE #2   AV2 = -240 NANOSECONDS
PHASE #3   AV3 = +198 NANOSECONDS

MULTIPHASE POWER SUPPLY AND PHASE CONTROL

BACKGROUND

One class of conventional semi-resonant power converter circuits includes high-side (such as control switch circuitry) and low-side switches (synchronous switch circuitry) that transfer power from an input source to a tapped inductor that supplies output power to a load. In such conventional semi-resonant power converter circuits, a tapped inductor is also connected to a second low-side switch, namely, a synchronous rectification (SR) switch.

In order to meet the power requirements for a load of a semi-resonant converter (e.g., provide a near constant output voltage for the load), many conventional semi-resonant DC-DC converters employ a variable switching frequency in which a respective switching period of each phase varies from cycle to cycle. During a portion of each switching period, the SR switch is enabled such that current flows through it. For the semi-resonant converter described above, the current during this portion of a switching period will be shaped like one half cycle of a sinusoidal period. The time interval for this half-cycle sinusoid is determined by reactive elements within passive circuitry of the semi-resonant converter, e.g., the natural resonant frequency of an inductor/capacitor (LC) resonant tank and other passive components within the semi-resonant DC-DC converter determine this time interval.

In order to minimize voltage and current ripple at the output of a voltage converter and to scale up its power output, a voltage converter may make use of multiple phases. The phases are each, effectively, separate voltage converters wherein each is tied to a common input voltage source and powers a common output load. To maintain stability and minimize the ripple, the phases should be driven by a common switching frequency, but with the switch control signals to each of the phases staggered in time.

BRIEF DESCRIPTION

This disclosure includes the observation that a problem with conventional multi-phase semi-resonant converters is that the time interval of the half-cycle sinusoidal-shaped current (linked to the resonant frequency of the phases) will often vary from one phase to another due to variations in the inductance and capacitance of corresponding components associated with each of the phases. A controller using a common (but variable) switching frequency for all of the phases, and staggered versions of a control signal to drive the SR switches for each phase of a semi-resonant converter, will not achieve the zero-current switching (ZCS) described earlier. More particularly, the time interval of the half-cycle sinusoidally-shaped current for some phases of the semi-resonant voltage converter may be relatively short whereas others may be relatively long. This means the controller may disable SR switches for some phases while positive current is still flowing through the SR switches. Alternatively, the controller may disable other SR switches when negative current is flowing through these SR switches. The efficiency of the multi-phase semi-resonant converter is reduced due to the inability to achieve ZCS for the SR switch in every phase of such a voltage converter.

Embodiments herein include novel ways of controlling multiple phases in a power supply to achieve synchronization and/or zero current switching amongst multiple phases that otherwise operate out of sync at different resonant frequencies.

More specifically, embodiments herein include a multi-phase power supply circuit. The multi-phase power supply circuit includes multiple phases such as a first phase (master phase) and a second phase (slave phase) to power a dynamic load. Each of the phases includes high side switch circuitry (such as control switch circuitry) and low side switch circuitry (such as synchronous switch circuitry) connected to a switching node. In one embodiment, each of the multiple phases operates at different resonant frequencies due to circuit variations in (inductance, capacitance, resistance, etc.) respective circuit components used in the phases.

In accordance with further example embodiments, assume that the first phase includes a (first) inductor device through which first current is delivered from the first phase to the load. Further assume that the second phase includes a second inductor device through which second current is delivered from the second phase to the load. A monitor circuit of the multi-phase power supply circuit is operable to monitor a node of the second inductor device; a magnitude of monitored parameter such as voltage of the node indicates a status of the second current conveyed through the second inductor device of the second phase to the load. Control circuitry of the multi-phase power converter is operable to adjust timing of activating a respective control switch in the second phase to an ON state based on the monitored voltage. In other words, the control circuitry adjusts timing of either or both a rising edge (activation of the respective control switch) and falling edge (the activation of the respective control switch) to achieve zero current switching in each of one or more slave phases.

Timing adjustments implemented by the control circuitry can include offsetting, delaying, spacing etc., the phases for each switching cycle based on a switching period of the master phase such that the synchronous switch circuitry in the one or more slave phases turn off at a time in which current outputted from the phase is substantially zero (so-called zero current switching).

In accordance with further embodiments, the controller circuitry and/or monitor circuit (such as a voltage monitor circuit) can be operated to continuously monitor the difference between actual and calculated zero crossings for a respective slave phase. The control circuitry uses the identified difference (timing adjustment information or calibration information) to adjust the respective slave phase with respect to the master phase. The detected difference can be stored as phase adjustment information and later applied to provide adjustments to one or more respective slave phases.

As circuit components and corresponding attributes (such as capacitance, inductance, etc.) in each phase changes over time (such as due to age degradation), the timing adjustment information can be updated to accommodate such changes so that each of the respective phases operates in a respective zero current switching mode.

Further embodiments herein include selecting a master phase (named phase 1) and treating phase 1 as the master/reference phase for getting the switching period (ON+OFF time, ignoring tristate times in between). Alternatively, embodiments herein include, instead of using Tsw(phase 1) as the master switching period, the period can be Tsw(phase x), where x is any one of the phases or an average amongst the phases. In one embodiment, the selected phase may be picked based on the circuit board layout, the period can be picked algorithmically through the selected phase's OFF time relative to the other phases' OFF times, etc.

In yet further alternative embodiments, the switching period to stagger activation of the phases can be produced based on periods of multiple phases (such as all of the phases). For example, the period can be a function $f$ of (Tsw(phase1), Tsw(phase2), . . . Tsw(phasen), where $f$ is a function of the various periods. In this case, since there is no real master phase, the ON times of all the phases are adjusted so that zero current switching occurs in each of the phases.

Embodiments herein provide advantages over conventional techniques. For example, controlling the timing (ON time) of activating/deactivating respective control switch circuitry (as opposed to forcing a change to timing of the synchronous switch circuitry) in each of the slave phases supports synchronization amongst the phases as well as zero current switching of synchronous switch circuitry in the slave phases. Synchronizing the phases in this manner reduces ripple voltage on the output voltage of the multi-phase power supply circuit. Zero current switching of otherwise different resonant frequency phases results in higher power conversion efficiency.

These and other more specific embodiments are disclosed in more detail below.

Note that although embodiments as discussed herein are applicable to multi-phase power supply circuits such as multi-phase semi-resonant DC-DC converters, the concepts disclosed herein may be advantageously applied to any other suitable topologies as well general power supply control applications.

Note further that embodiments herein can include computer processor hardware (that executes corresponding switch instructions) to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, . . . ) including computer program logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling phases in a power supply. For example, in one embodiment, the instructions, when carried out by a computer processor hardware, cause the computer processor hardware to: control a first phase of multiple phases, the first phase including a first inductor device through which first current is delivered to a load; control a second phase, the second phase including a second inductor device through which second current is delivered to the load; monitor a node of the second inductor device to detect a magnitude of the second current conveyed through the second inductor device to the load; and adjust timing of activating a control switch in the second phase to an on state based on the monitored voltage.

The ordering of the steps has been added for clarity sake. These steps can be performed in any suitable order.

It is to be understood that the system, method, device, apparatus, etc., as discussed herein can be embodied strictly as hardware, as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 8 is an example diagram illustrating generation, storage, and use of phase adjustment information according to embodiments herein.

DETAILED DESCRIPTION

Figure 1:
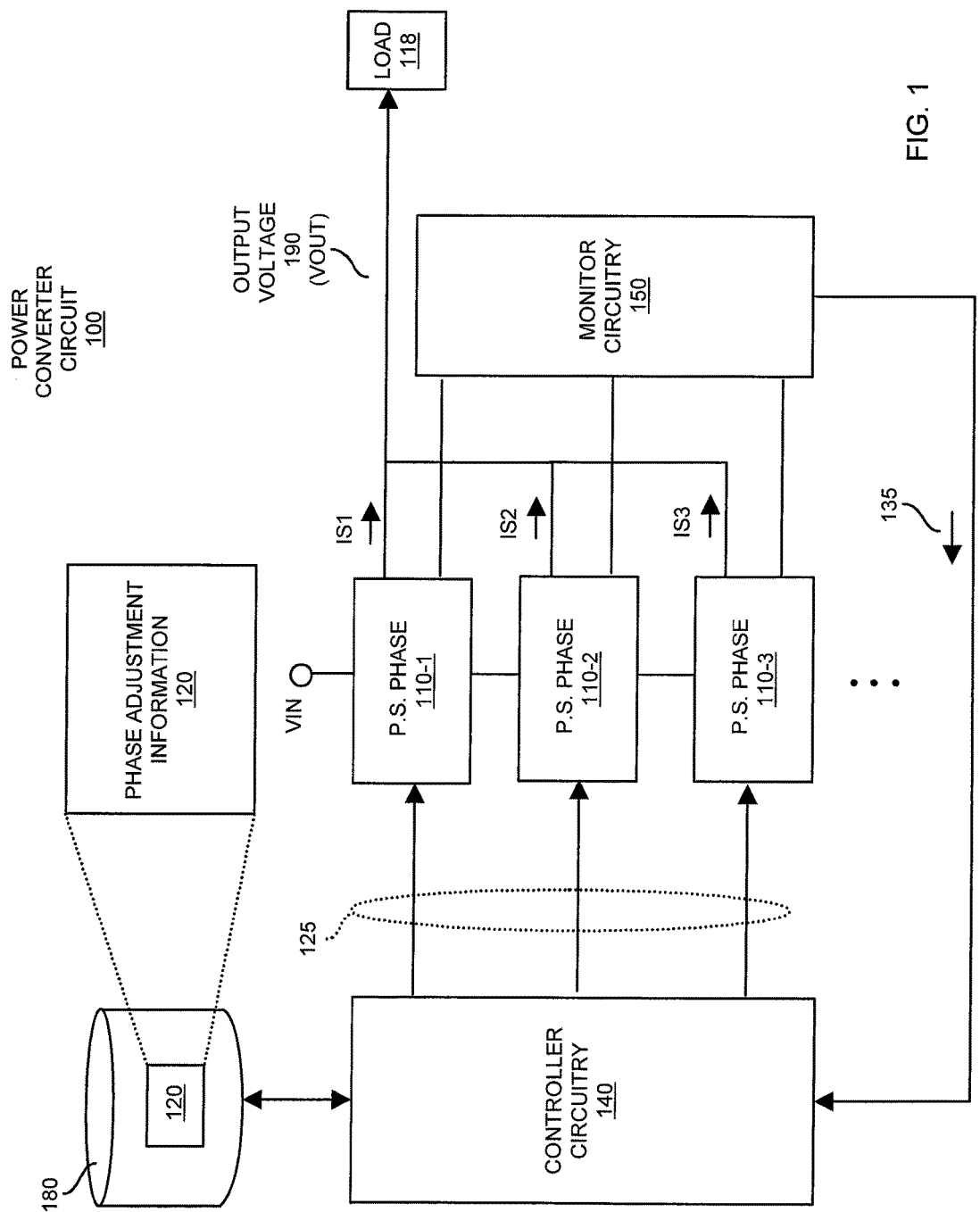
FIG. 1 is an example general diagram of a power converter circuit including multiple phases and respective circuitry according to embodiments herein.

Now, more specifically, FIG. 1 is an example diagram of a power converter circuit and respective circuitry according to embodiments herein.

As shown, the power converter circuit 100 includes multiple phases 110 (such as phase 110-1, phase 110-2, phase 110-3, etc.). Additionally, power converter circuit 100 includes controller circuitry 140 and monitor circuitry 150.

Each of the multiple phases 110 receives input voltage (Vin) such as a DC (Direct Current) voltage. The phases 110 collectively produce output voltage 190 (Vout such as a DC voltage). Thus, the power converter circuit 100 can be a DC to DC power converter.

In one embodiment, the controller circuitry 140 is operable to produce and then use phase adjustment information 120 to generate control signals 125 that, in turn, control respective phases 110 and delivery of current IS1, IS2, IS3, etc., to the load 118.

More specifically, during operation, the monitor circuitry 150 monitors a respective node in each of the phases 110; a magnitude of the voltage of the respective node over time indicates attributes a status of corresponding current delivered by the phases 110 to the load 118. The monitor circuitry 150 forwards the detected status of the phases as feedback 135 to the controller circuitry 140.

Based on feedback 135 from the monitor circuitry 150, the controller circuitry 140 produces phase adjustment information 120 for storage in repository 180. The controller circuitry 140 subsequently uses the phase adjustment information 120 to control timing of generating control signals 125 to control first phase 110-1, second phase 110-2, third phase 110-3, etc.

As further described herein, the monitor circuitry 150 and/or controller circuitry 140 can be configured to monitor (such as continuously, occasionally, periodically, etc.) the difference between actual and calculated zero crossings for a respective phase. To improve the efficiency of the power converter circuit 100, the controller circuitry 140 uses the phase adjustment information 120 (detected difference) to implement one or more functions such as zero current switching, synchronization of slave phases to a master phase (such as phase #1), etc.

Figure 2A:
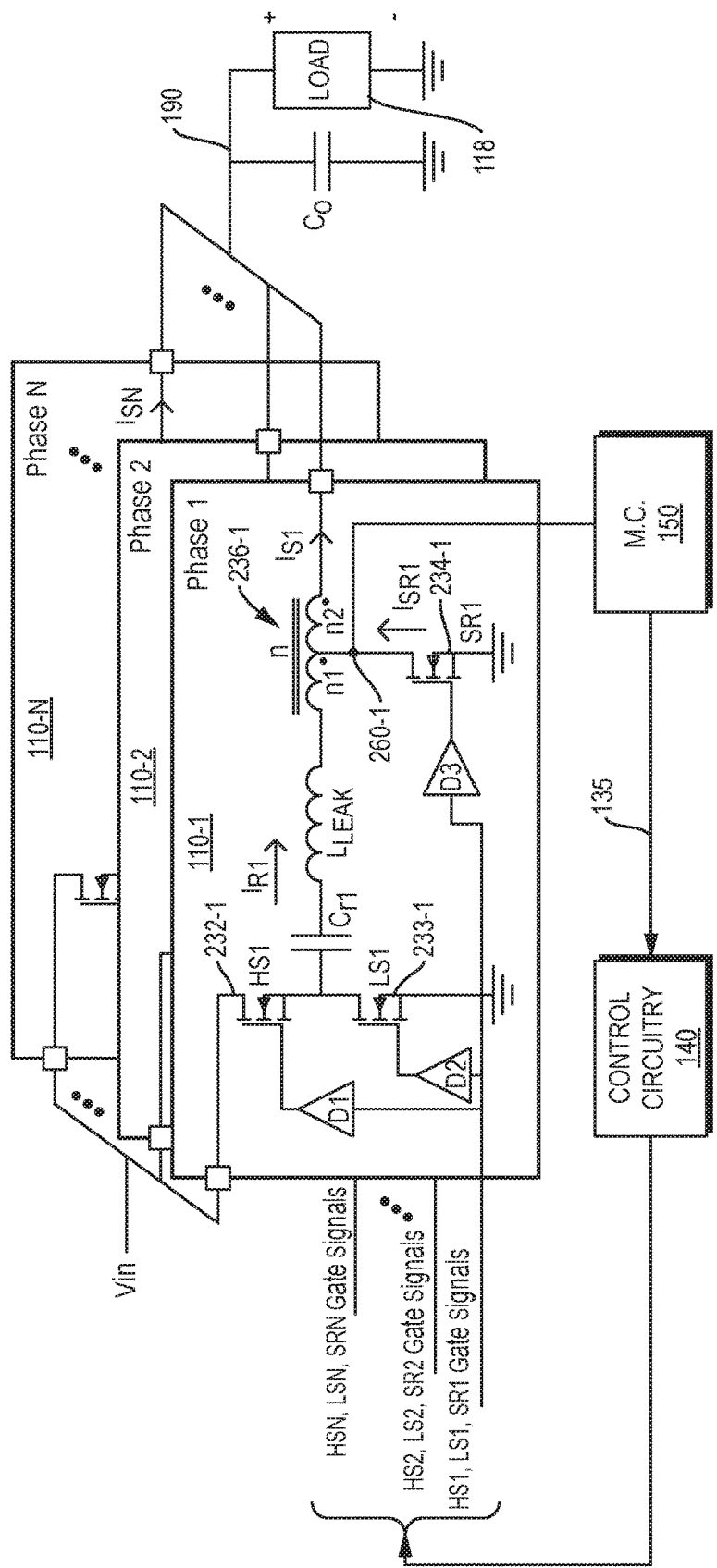
FIG. 2A is a more detailed diagram illustrating a power converter circuit and details of a first phase of multiple phases and corresponding circuitry according to embodiments herein.

FIG. 2A is an example more detailed diagram illustrating a power converter circuit including multiple phases and corresponding circuitry according to embodiments herein.

As shown and as previously discussed, power converter circuit 100 includes multiple phases 110. Each of the phases 110 can be configured in a similar manner as shown for phase 110-1. For example, phase 110-2 of FIG. 2B includes the same circuit components as shown for phase 110-1; phase 110-3 of FIG. 2C includes the same circuit component as shown for phase 110-1; and so on.

Referring again to FIG. 2A, phase 110-1 includes multiple components including: driver circuitry D1 to control a state of switch circuitry HS1 (high side switch circuitry or control switch circuitry), driver circuitry D2 to control a state of switch LS1 (low side switch circuitry or synchronous switch circuitry), driver circuitry D3 to control a state of switch SR1 (low side switch circuitry or synchronous resonator switch circuitry).

Phase 110-1 includes high side switch 232-1 (HS1), low side switch 233-1 (LS1), capacitor Cr1, inductor Lleak (model or actual component), inductor device 236-1, and switch circuitry 234-1 (SR1). In one embodiment, the node 260-1 is a tapped node of inductor device 236-1; during operation, the controller circuitry 140 selectively couples the tapped node to a reference voltage (ground potential).

Note that an additional example of the phase 110-1 (and other phases) in this disclosure is shown as phase 230 in FIG. 2 of U.S. patent application Ser. No. 15/154,434, filed on May 13, 2016, the entire teachings of which are incorporated herein by reference. Note that the present application is also related to U.S. patent application Ser. No. 15/154,520, filed on May 13, 2016, the entire teachings of which are incorporated herein by reference.

Figure 2B:
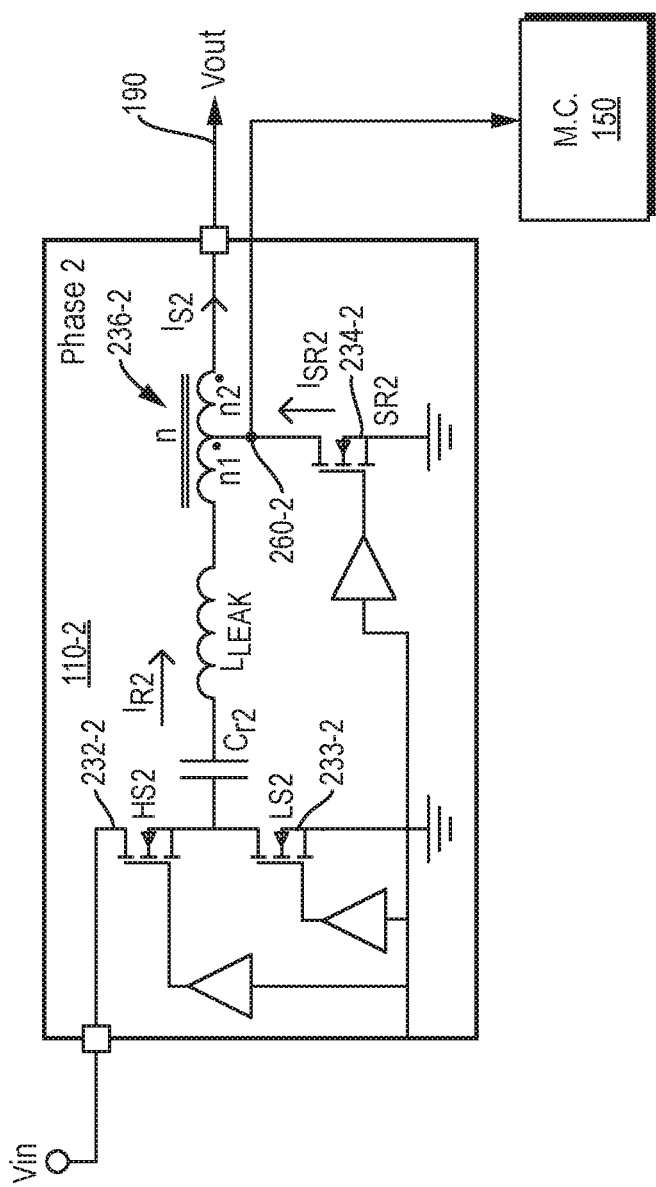
FIG. 2B is a detailed diagram illustrating a power converter circuit and details of a second phase according to embodiments herein.

FIG. 2B is a more detailed example diagram illustrating a power converter circuit and details of a second phase of multiple phases and corresponding circuitry according to embodiments herein.

In this example embodiment, phase 110-2 includes components such as high side switch circuitry 232-2 (HS2), low side switch circuitry 233-2 (LS2), low side resonant switch circuitry 234-2 (SR2), and inductor device 236-2.

In one embodiment, during operation of power converter circuit 100 powering load 118, the monitor circuitry 150 monitors the voltage of node 260-2 of the second inductor device 236-2; a magnitude of the voltage at node 260-2 indicates a status of the second current IS2 (when switch circuitry SR2 is ON) conveyed through the second inductor device to the load 118. Current through the field effect transistor ON drain-source resistance of the switch produces the voltage at node 260-2. The monitor circuitry 150 conveys the monitored voltage information as feedback 135 to the controller circuitry 140.

The controller circuitry 140 adjusts timing of activating the control switch 232-2 in the second phase 110-2 to an ON state based on the monitored voltage as indicated by feedback 135. As further discussed below in more detail, the controller circuitry 140 is operable to pace activation of each phase to reduce ripple voltage. Additionally, as further discussed below, the adjustment to timing of activating the control switch 232-2 (such as adjustment of timing of one or more edges) achieves zero current switching in the second phase 110-2.

Figure 2C:
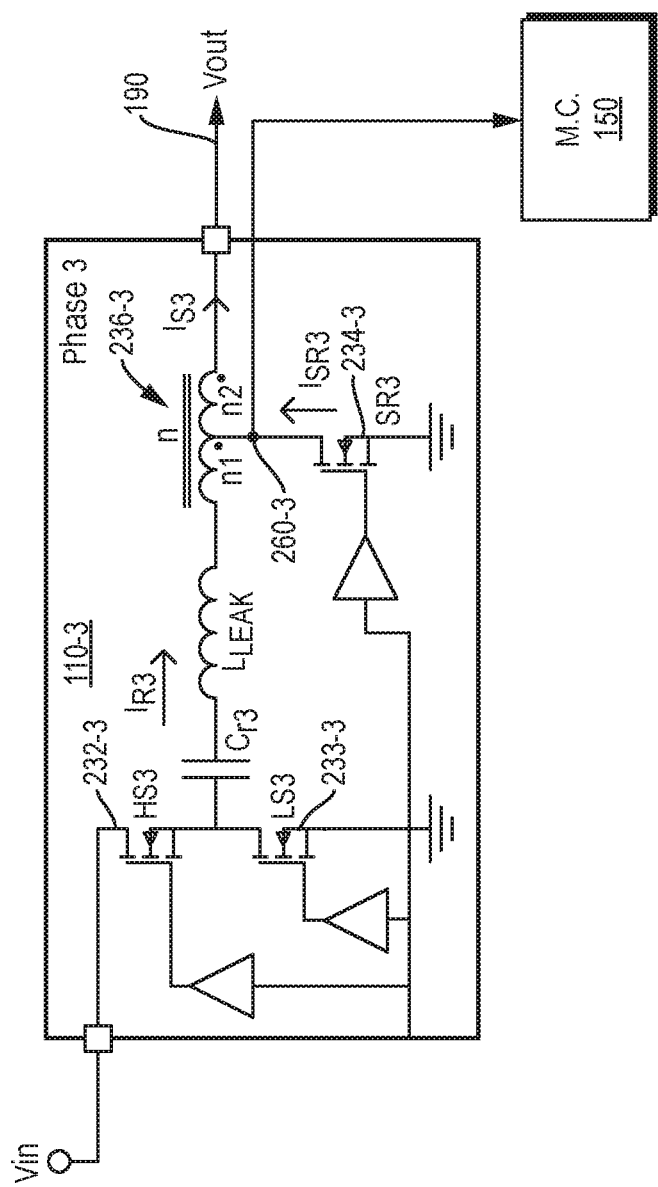
FIG. 2C is a detailed diagram illustrating a power converter circuit and details of a third phase according to embodiments herein.

FIG. 2C is an example more detailed diagram illustrating a power converter circuit and details of a first phase of multiple phases and corresponding circuitry according to embodiments herein.

In this example embodiment, phase 110-3 includes components such as high side switch circuitry 232-3 (HS3), low side switch circuitry 233-3 (LS3), low side resonant switch circuitry 234-3 (SR3), and inductor device 236-3 (such as a tapped inductor).

In general, in accordance with embodiments herein, the monitor circuitry 150 monitors voltage of a node of the tapped inductor in phase 110-3 to produce an adjustment value to adjust subsequent timing of a respective control signal controlling high side switch circuitry 232-3 to achieve zero current switching in phase 110-3.

Figure 3:
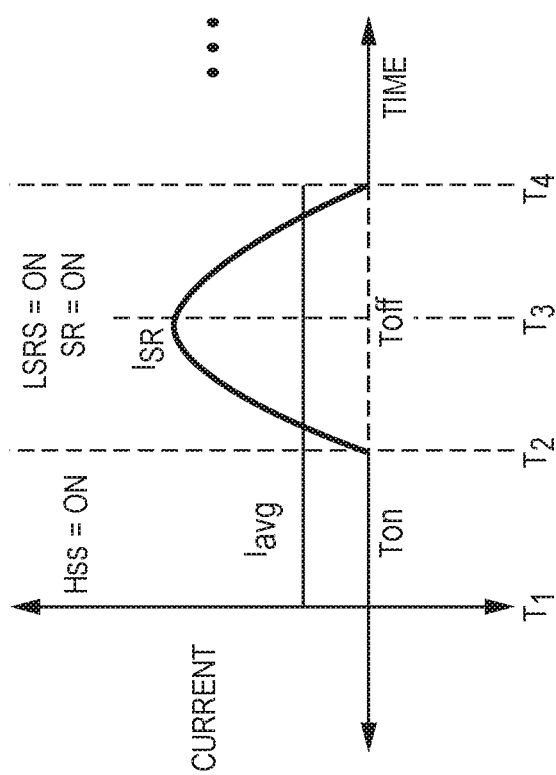
FIG. 3 is an example diagram illustrating half-sine wave current through a low side switch according to embodiments herein.

FIG. 3 is an example diagram illustrating half sine SR current through a low side switch according to embodiments herein.

In this topology, the period for any phase is determined by the sum of its ON time (when high side switch circuitry is ON) and OFF time (when low side switch circuitry is ON). For best efficiency, SR1 should be switched off when Isr1 crosses zero (zero current switching). The controller circuitry 140 senses either the output current (ISn) or the current through SRn (ISRn) to figure out the zero crossing instant. While the controller circuitry 140 controls the ON time to regulate the output voltage (Vo=Vi*D/n) where D is the duty cycle and n is the turns ratio of the inductor, the OFF time, for best efficiency, is dictated by the resonant capacitor (Cr) and the leakage inductance (LLeak). So, each phase operate at its own natural frequency.

Figure 4A:
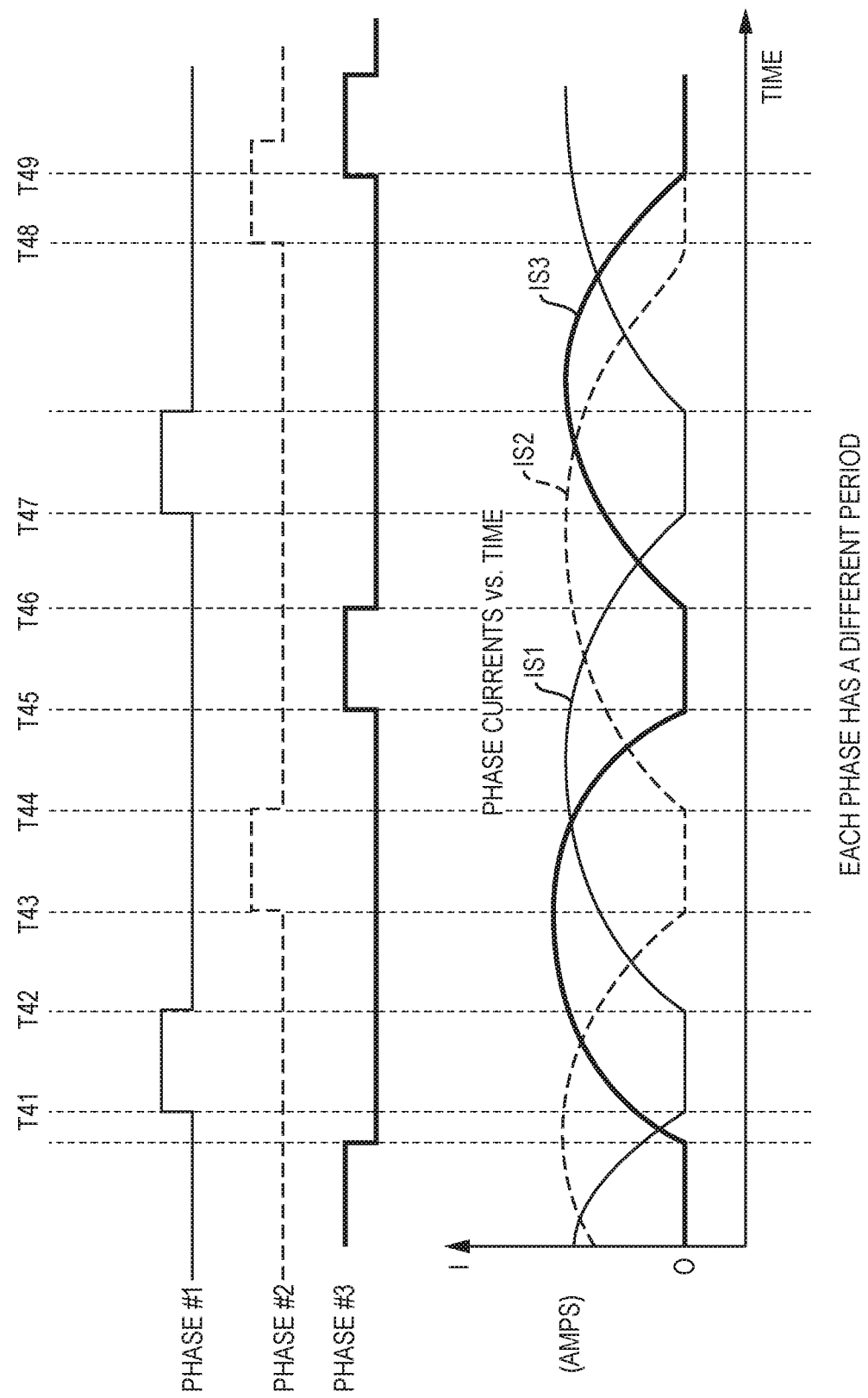
FIG. 4A is an example timing diagram illustrating asynchronous operation of multiple phases resulting in substantial ripple voltage.

FIG. 4A is an example timing diagram illustrating asynchronous operation of multiple phases resulting in substantial ripple voltage.

In this example, assume that the phases are operated asynchronously with respect to each other to provide current to power the load 118. In other words, for sake of example, the controller circuitry 140 operates each of the phases 110 at its own natural (resonant) frequency.

Figure 4B:
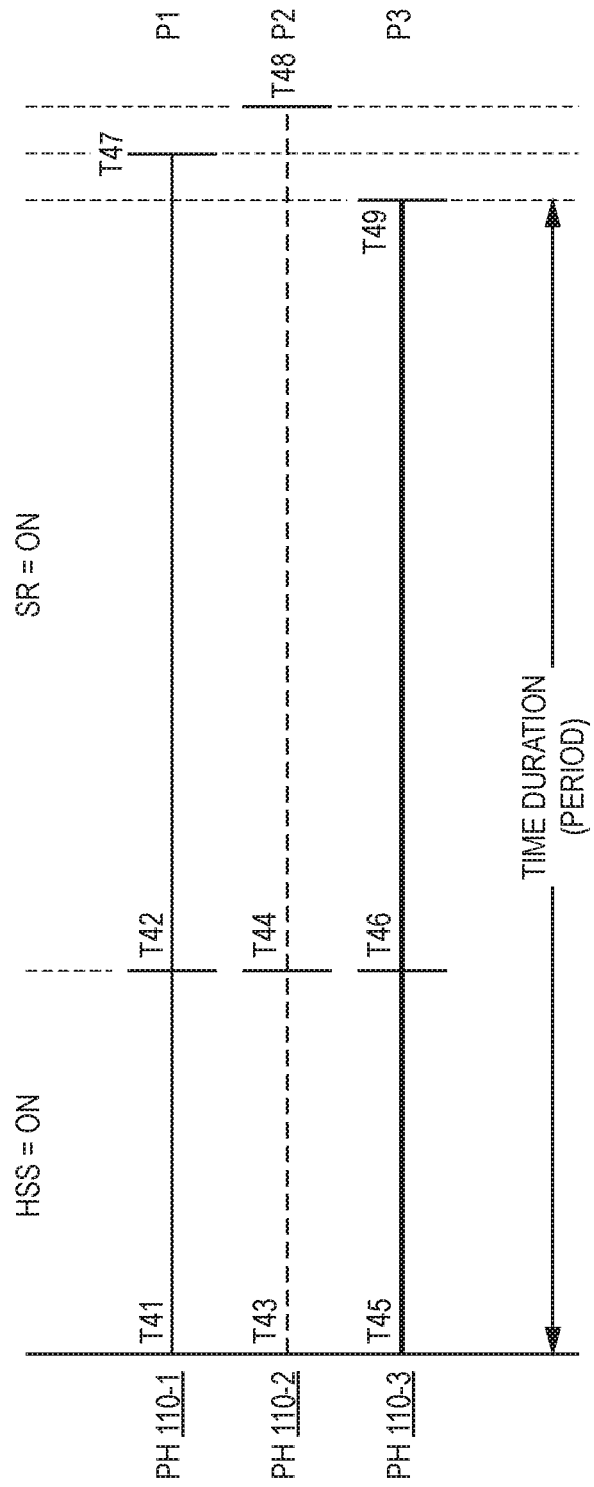
FIG. 4B is an example diagram illustrating a comparison of control periods associated with operation according to FIG. 4A.

As shown in FIG. 4B, the total switching period=pulse width ON of HS1+resonant off time of SR1. Period P1 for phase #1 is less than period P2 for phase #2; period P1 is greater than period P3 for phase #3; and so on.

As shown in FIG. 4B, the time in which respective high side switch circuitry for a phase is ON (between time T41 and time T42 for phase 110-1; between time T43 and time T44 for phase 110-2; between time T45 and time T46 for phase 110-3, etc.) is substantially the same value. The time in which respective low side resonant switch circuitry (SR switch) for a phase is ON (between time T42 and time T47 for phase 110-1; between time T44 and time T48 for phase 110-2; between time T46 and time T49 for phase 110-3, etc.) are substantially different. As shown in FIG. 4B, since the resonant OFF times (i.e., respective times when the corresponding synchronous resonant switch circuitry is activated in the phase) are different, each of the phases operates at a different frequency, resulting in a high amount of ripple voltage on the output voltage 190.

Figure 5A:
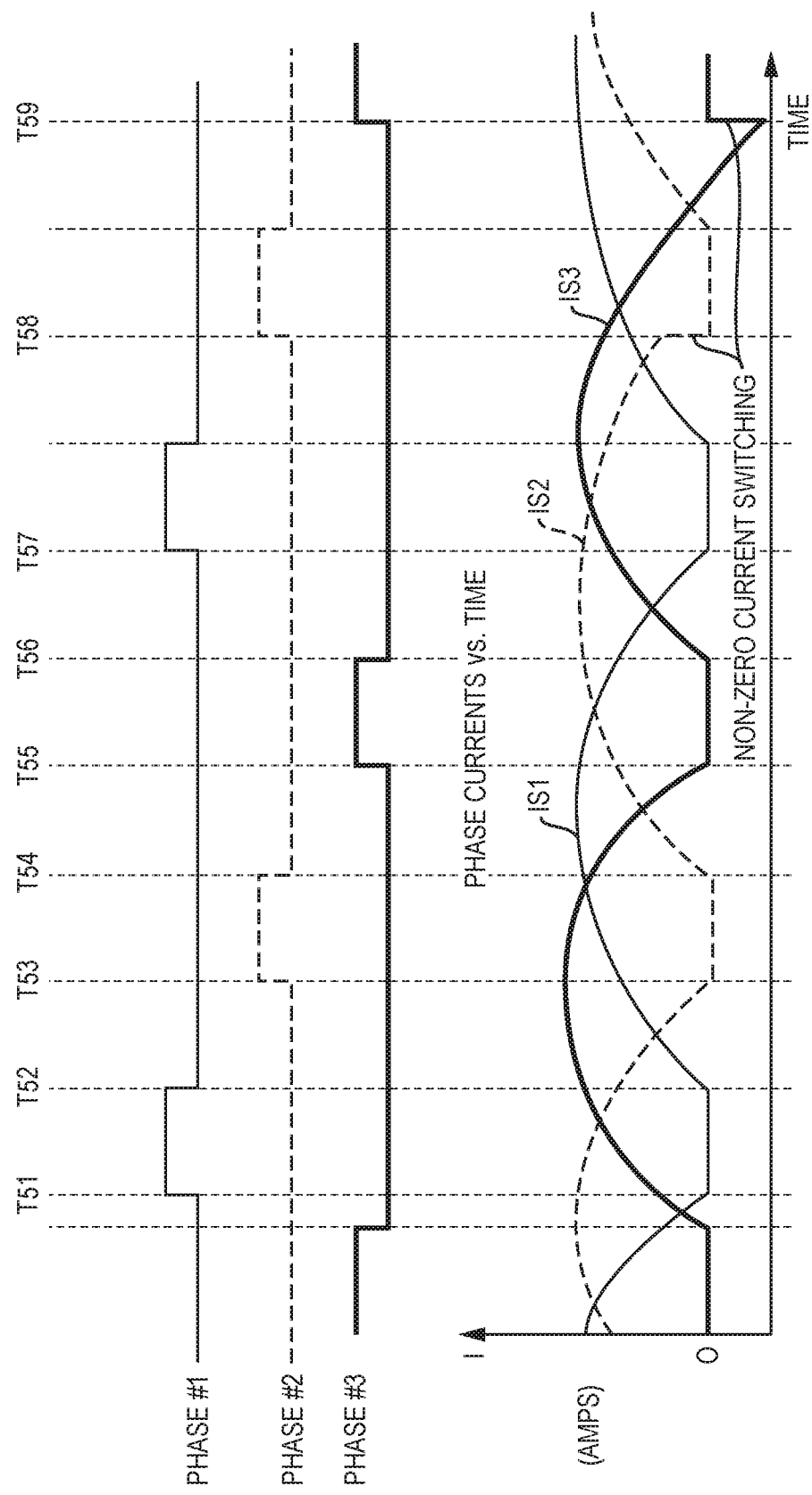
FIG. 5A is an example timing diagram illustrating forced synchronous control of each of multiple phases using common ON/OFF times resulting in non-zero switching current amongst one or more phases.

FIG. 5A is an example timing diagram illustrating synchronous control of each of multiple phases using common ON/OFF times resulting in non-zero current switching amongst one or more phases.

In this example, assume that the controller circuitry 140 operates in a manner such that the phases are synchronous and a respective OFF time of fixed duration is forced on each of the slave phases 110-2, 110-3, etc., resulting in non-zero current switching.

More specifically, as indicated by FIG. 5A, the controller circuitry 140 operates in a mode in which the activation time of high side switch circuitry are the same and activation time of low side resonant switch circuitry are the same for each of the phases. For example, as shown in FIG. 5B, the ON duration time for high side switch circuitry 232-2 between time T53 and time T54 for phase 110-2 is equal to the ON duration time of high side switch circuitry 232-1 between time T51 and time T52 for phase 110-1; the ON duration time for high side switch circuitry 232-3 between time T55 and time T56 for phase 110-3 is equal to the ON duration time of high side switch circuitry 232-1 between time T51 and time T52 for phase 110-1; and so on.

Figure 5B:
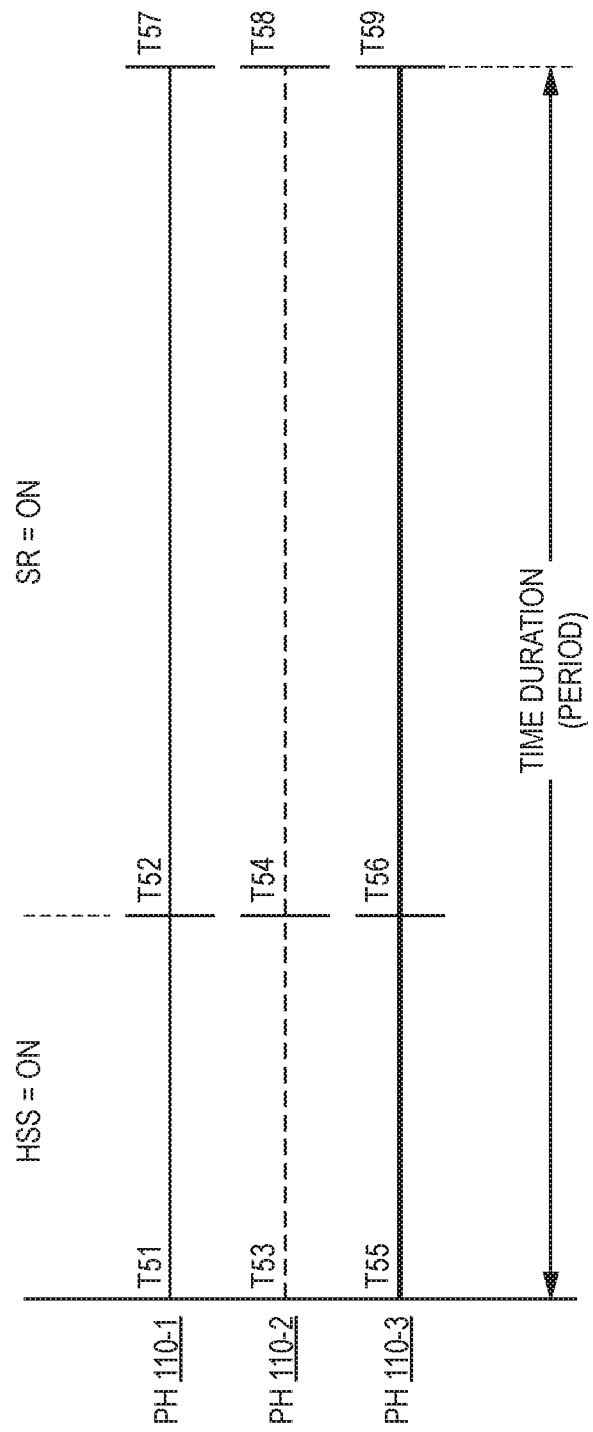
FIG. 5B is an example diagram illustrating a comparison of control periods associated with operation according to FIG. 5A.

In this example, the phases are operated synchronously as shown in FIG. 5B. However, switching in this manner (equal hi side activation pulse widths and then forces the same off time for all phases, i.e., T57−T52=T58−T54=T59−T56), irrespective of their resonant off time) results in non-zero current switching of IS2 as shown in FIG. 5A around time T58 for phase 110-2 and nonzero current switching for IS3 as shown around time T59 for phase 110-3.

For each case, the total switching period=common pulse width HSS ON time+common forced OFF time (SR=ON). FIG. 5B is an example diagram illustrating a comparison of control periods for operation according to FIG. 5A.

Figure 6A:
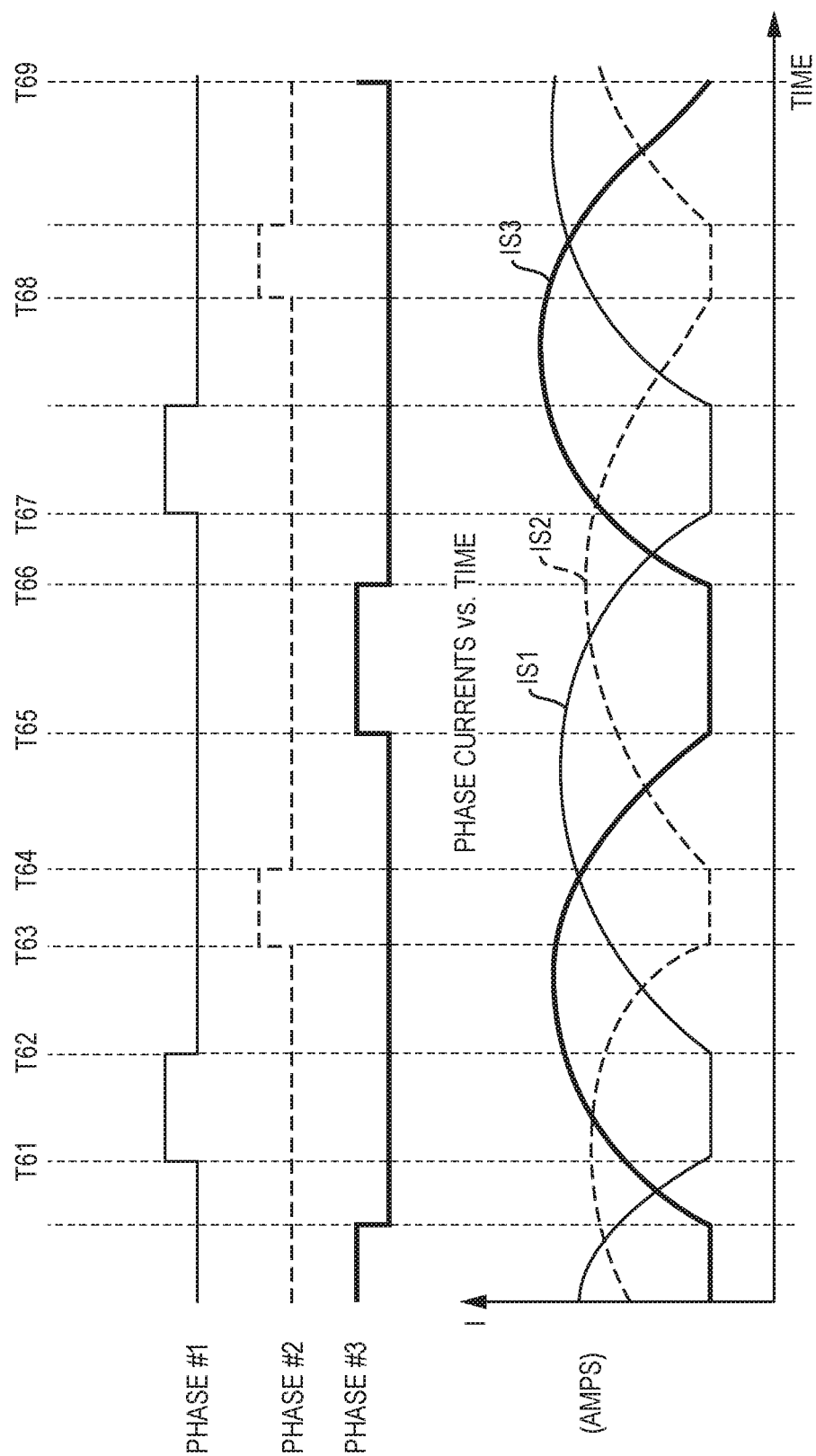
FIG. 6A is an example timing diagram illustrating application of ON/OFF time adjusted, synchronous control signals to control multiple phases according to embodiments herein.

FIG. 6A is an example timing diagram illustrating application of time adjusted, synchronous control signals to control multiple phases according to embodiments herein.

In this example embodiment, the controller circuitry 140 operates to provide synchronous phase control as well as zero current switching.

For example, embodiments herein include adjusting high side switch ON times of phases 2, 3, etc., so that the overall period (or frequency) of all the phases are the same, but each phase supports zero current switching.

In FIG. 6A, the controller circuitry 140 adjusts the pulse widths of one or more phases so that the total switching period for each phase is the same. (total switching period=individual_pulse width+resonant off time). If the resonant OFF time (when the SR switch is activated) for a phase is high, in accordance with store phase adjustment information 120, the controller circuitry 140 reduces the respective ON time pulse widths for the phase. If the resonant OFF time for a phase is low, in accordance with stored phase adjustment information 120, the controller circuitry 140 increases the respective ON time pulse widths for the phase.

Figure 6B:
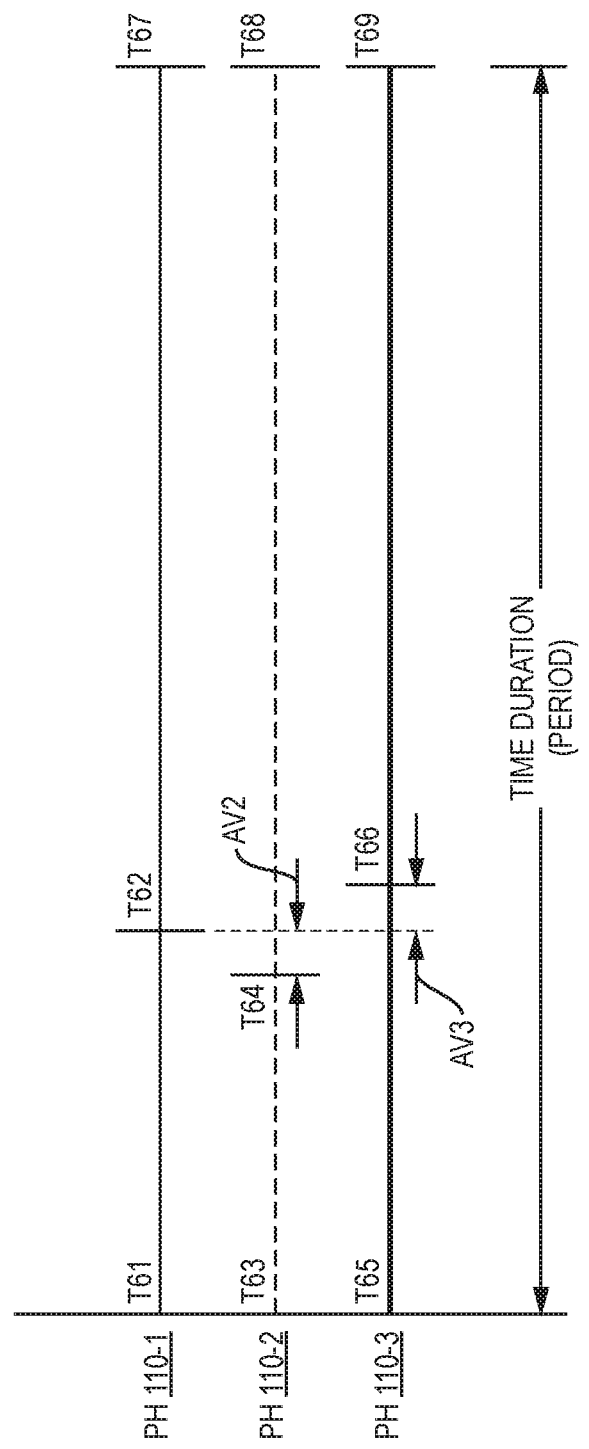
FIG. 6B is an example diagram illustrating a comparison of control periods for operation according to FIG. 6A according to embodiments herein.

FIG. 6B is an example diagram illustrating a comparison of control periods for operation according to FIG. 6A. As shown, the controller circuitry 140 applies phase adjustment information 120 to provide zero current switching amongst the master and slave phases.

The following discussion is based on respective to both FIGS. 6A and 6B.

For example, as shown in FIG. 6B, phase 110-1 is designated as the master phase, dictating the period to apply to each of the phases. In one embodiment, the period of the master phase (phase 110-1) includes a first portion in which the high side switch circuitry 232-1 is activated between time T61 and time T62 (ON time); the low side resonant switch circuitry for phase 110-1 is activated between time T62 and time T67 (OFF time). Note that any of the phases 110 can be selected to be the master phase.

In one embodiment, resonant characteristics of phase 110-2 are known from previous monitoring of one or more cycles of phase #2 and when zero current switching occurs in a cycle. To provide synchronous switching amongst the phases 110, and zero current switching for phase 110-2, the controller circuitry 140 activates the high side switch circuitry 232-2 associated with phase 110-2 between time T63 and time T64 (the duration of which is was reduced by value AV2 with respect to the time between T61 to T62 and as specified by the phase adjustment information 120). The controller circuitry 140 activates the low side resonant switch circuitry 234-2 to an ON state between time T64 and time T68. This adjustment of reducing the time in which the high side switch circuitry 232-2 for phase #2 is activated ensures that the zero current switching associated with the low side resonant switch circuitry 234-2 occurs at or around time T68.

Further in this example embodiment, resonant characteristics of phase 110-3 are known from previous monitoring of phase #3 and when zero current switching occurs in a cycle. To provide synchronous switching amongst the phases 110, and zero current switching for phase 110-3, the controller circuitry 140 activates the high side switch circuitry 232-3 associated with phase 110-3 between time T65 and time T66 (the duration of which was increased by value AV3 with respect to the time between T61 to T62 and as specified by the phase adjustment information 120). The controller circuitry 140 activates the low side resonant switch circuitry 234-3 to an ON state between time T66 and time T69 (in accordance with its natural resonant frequency). The adjustment of increasing the time in which the high side switch circuitry 232-3 is activated ensures that the zero current switching associated with the low side resonant switch circuitry 234-3 occurs at or around time T69.

Embodiments herein can include the adjusting rising and/or falling edges of activating respective high side switch circuitry in the phase to achieve zero current switching. Applying adjustments to one or more edges of the timing of activating the control switch in a second phase accounts for circuit component variations (natural resonant frequency variations) amongst the phases. Thus, even though the first phase 110-1, the second phase 110-2, the third phase 110-3, etc., in this example operate at different resonant frequencies, the adjustment to timing of activating the control switch 232-2 provides zero current switching in the second phase 110-2.

Additional example embodiments of producing and applying phase adjustment information 120 are further discussed below.

Figure 7:
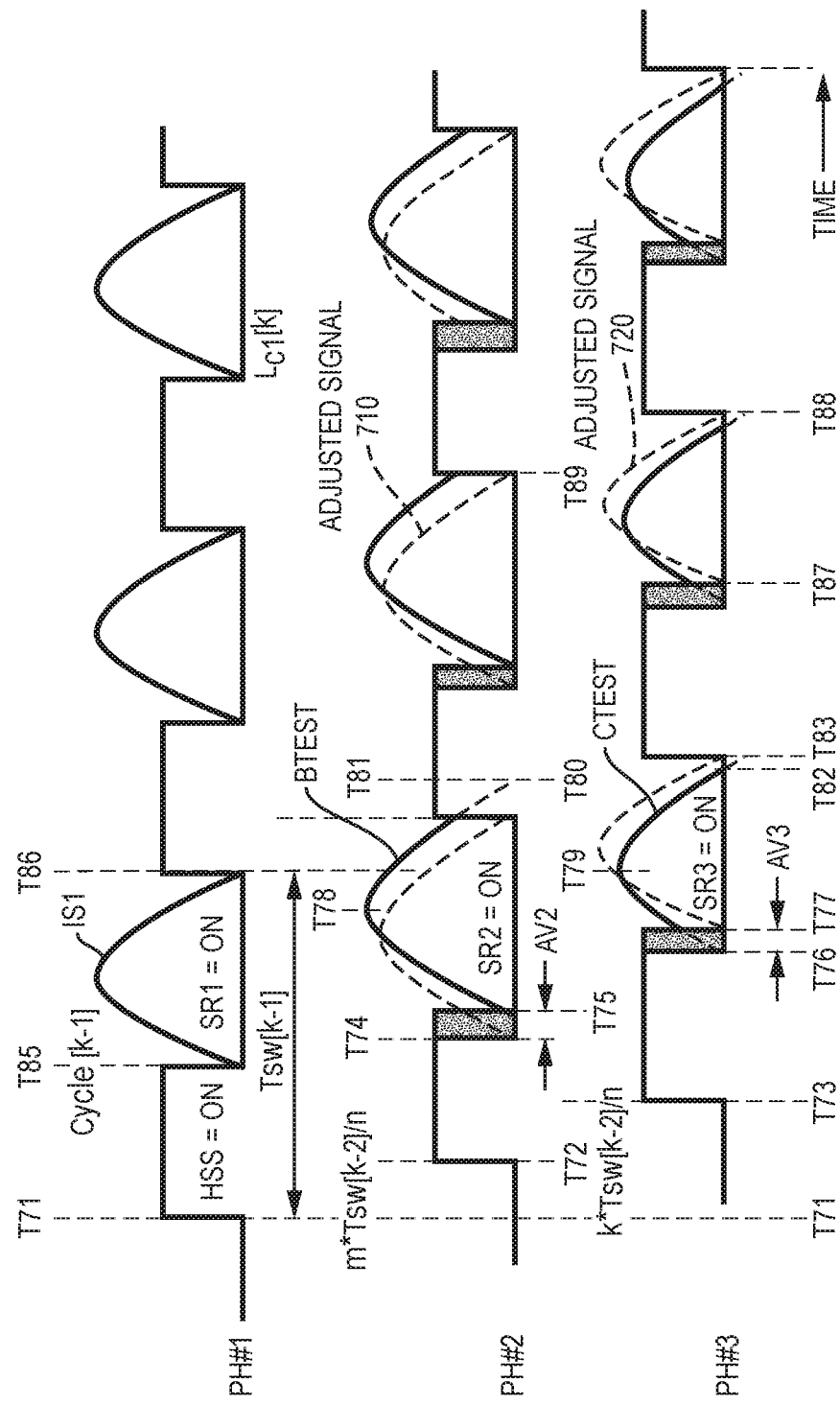
FIG. 7 is an example timing diagram illustrating how to monitor and subsequently adjust timing of synchronous control signals to reduce ripple voltage and provide zero current switching according to embodiments herein.

FIG. 7 is an example timing diagram illustrating how to monitor operation of a power supply to produce phase adjustment information for subsequently adjusting timing of synchronous control signals according to embodiments herein.

An example algorithm implemented by the controller circuitry 140 to synchronize zero current switching amongst phases is as follows:

1. For each of one or more cycles, the controller circuitry 140 determines the OFF time (SR1 switch ON such as example time between T85 and T86 for one or more cycles) of phase 110-1 via current sensing at node 260-1 for phase 110-1, node 260-2 for phase 110-2, node 260-3 for phase 110-3, etc.

2. From the latest (most recent detected) ON time for phase 110-1 (such as time between T71 and time T85) and a filtered value of its respective OFF time T85 to T86 of phase 110-1 over one or more prior cycles, the controller circuitry 140 predicts when the next zero crossing (of current ISR1) is anticipated for phase 110-1 (on next pulse start, such as at time T86).

3. Based on information from above, the controller circuitry 140 produces period information associated with controlling activation of the first phase 110-1 to use as a baseline for other phases (see also FIG. 6B as previously discussed). As further discussed below, the controller circuitry 140 utilizes the generated period information (which is approximately equal to time between time T71 and T86) of a first phase 110-1 to control timing of activating the control switch circuitry 232-2 in the second phase 110-2.

For example, in one embodiment, using the baseline period for phase 110-1 (generally, based on one or more cycles of time between T71 and T86), the controller circuitry 140 calculates the zero cross times (pulse starts) for phases 110-2 and 110-3 to provide zero current switching. In one embodiment, the controller circuitry 140 is operable to equally space high side switch ON times (see FIG. 6A) to reduce or minimize ripple voltage on the output voltage 190.

4. As previously discussed, because each of the phases has different characteristics (i.e., circuit components in each of the phases has different capacitance, inductance values, etc.), the start times of phases 110-2 and 110-3 may not coincide with their true zero crossings (determined by current sensing). The controller circuitry 140 can be configured to determine the error between the calculated zero crossing and the actual zero crossing.

5. In accordance with further embodiments, note that the true zero crossings of phases 110-2 and 110-3 can also be determined in any suitable manner such as actual measurement or estimated.

For example, in one embodiment, referring to FIG. 3, the controller circuitry 140 measures the time between their pulse negative edge at T2 and the peak of the current (in FIG. 3) at time T3. The controller circuitry 140 doubles the time difference between time T3 and time T2 to estimate the zero crossing time at time T4. Thus, the controller circuitry 140 can estimate timing of a zero crossing is supposed to actually measuring the zero crossing for a phase.

Referring again to FIG. 7, the controller circuitry 140 knows the start time of activating switch SR2 is at time T75. Via feedback 135 received from the monitor circuitry 150, for a given control cycle, the controller circuitry 140 detects that the peak current during activation of SR2 in phase 110-2 is at time T78 for signal BTEST. As previously discussed, the monitor circuitry 150 can be configured to implement a peak detector circuit to detect that the peak occurs at T78. In one embodiment, the controller circuitry 140 doubles the time difference between T78 and T75 to determine (interpolate) when zero current switching would occur. Using this information, the control circuitry 140 determines that the time of activating the high side switch circuitry 232-2 needs to be reduced by an amount AV2 on one or more subsequent cycles (as indicated by adjusted signal 710) in order to ensure zero current switching occurs in the phase 110-2.

In a similar manner, the controller circuitry 140 can be configured to monitor peak current associated with CTEST at time T79 to produce the value AV3, which is an amount of additional time that high side switch 232-3 needs to be activated in a subsequent cycle in order to ensure zero current switching occurs in the phase 110-3.

In accordance with further embodiments, note that the controller circuitry 140 can be configured to monitor the actual time of zero current switching and then adjust accordingly on one or more subsequent control cycles such that zero current switching is achieved.

As an alternative to measuring peak information as discussed above, note that the controller circuitry 140 can be configured to measure when actual zero current switching occurs in a phase. For example, the controller circuitry 140 can receive feedback 135 from the monitor circuitry 150 indicating that the zero crossing for phase 110-3 occurs at time T82 and that the negative current through the switch SR3 occurs until time T83, at such time when the switch SR3 is turned OFF. In this instance, on a subsequent cycle, to achieve zero current switching, the control circuitry 140 delays shutting off the high side switch circuitry 232-3 for an additional time of AV3 until time T87 on one or more subsequent cycles of adjusted signal 720 such that activation of the high side switch circuitry 232-3 occurs at time T88 when current through the switch SR3 (low side resonant switch circuitry) is approximately zero.

As previously discussed, the controller circuitry 140 can be configured to continuously monitor feedback 135 to identify how to modify the phase adjustment information 120 such that each of the phases experiences zero current switching. In certain instances, the phase just information 120 can be stored in repository 180 as calibration values (adjustment values AV2, AV3, etc.) that are then used to support the zero current switching amongst the phases. Continuous updating of phase adjustment information accounts for component variations (and changes in natural frequencies of the phases) over time.

Accordingly, embodiments herein include producing an adjustment value based on a respective monitored node voltage, the adjustment value being a timing value in which to modify a timing of activating the control switch in the second phase for one or more subsequent control cycles; and storing the adjustment value for later retrieval.

6. Referring again to the timing diagram in FIG. 7, using the received error information, the controller circuitry 140 produces respective phase adjustment information 120 (such as adjustment value AV2 for phase 2, adjustment value AV3 for phase 3, etc.) for storage in represent 180 as phase adjustment information 120.

As previously discussed, the controller circuitry 140 uses the feedback 135 from monitor circuitry 150 to detect that activation of the SR2 switch (low side resonant switch in phase 110-2) should be activated earlier in a cycle (as indicated by AV2) to achieve zero current switching in phase 110-2; the controller circuitry 140 uses the feedback 135 from monitor circuitry 150 to detect that activation of the SR3 switch (low side resonant switch in phase 110-3) should be activated later in a cycle (as indicated by AV3) to achieve zero current switching in phase 110-3; and so on.

Accordingly, using learned adjustment values AV2, AV3, etc., the controller circuitry 140 adjusts a respective period for each phase. For example, adjustment to the timing of activating the control switch circuitry 232-2 in the phase 110-2 using AV2 results in zero current switching of the second phase 110-2 in which the control switch circuitry 232-2 is reactivated at a time (such as time T89) when zero current passes through a respective synchronous switch SR2 of the second phase 110-2 to the load 118. (Again, see adjusted signals 710 and 720.

Note that the controller circuitry 140 can take many forms. In one embodiment, the controller circuitry 140 includes and implements a PI controller (including a proportional component and a integrator component to control the switch circuitry in each phase.

FIG. 8 is an example diagram illustrating generation and storage of phase adjustment information according to embodiments herein.

In this example embodiment, as previously discussed, the phase adjustment information stored in repository 180 (for subsequent use) identifies which of the multiple phases 110 is designated as the master phase. For example, the phase 110-1 (i.e., phase #1) is designated as master phase. Each of phases 110-2 (i.e., phase #2), 110-3 (i.e., phase #3), etc., are designated as slave phases to be adjusted with respect to the master phase 110-1.

The value AV2 (−240 nanoseconds or other suitable time unit) indicates how much to adjust the activation of turning high side switch circuitry 232-2 (of phase 110-2) to an ON state such that the respective synchronous switch circuitry 234-2 (SR2) subsequently deactivates (i.e., is shut off) at a time when current through the synchronous switch circuitry 234-2 is substantially 0 amperes (such as less than 50 milliamps). In one embodiment, as previously discussed, the monitor circuitry 150 includes one or more different types of appropriate circuitry such as a comparator circuitry, threshold detector, peak detector, etc., to monitor when the current ISR1 is substantially zero amperes (such as less than 100 milliamps) at a respective peak time.

The value AV3 (+198 nanoseconds or other suitable time unit) indicates how much to adjust the activation of turning high side switch circuitry 232-3 to an ON state such that the synchronous switch circuitry 234-3 subsequently deactivates (i.e., is shut off) at a time when current through the synchronous switch circuitry 234-3 is substantially 0 amperes (such as less than 50 milliamps). In yet further alternative embodiments, note that selection of a master switching period in which to stagger the start times amongst the phases over a cycle can be produced based on measured periods of multiple phases (such as all of the phases) instead of a chosen single master phase. For example, embodiments herein can include: allowing each of the phases to run at their respective natural frequency, measuring a period of each phase run at its natural frequency, average the measured periods of the phases to produce Tave (average period), use the average period as a basis to synchronize the phases (for example, if there are 3 phases, Tave/3 defines spacing of phase based on average period), and then adjust one or more edges of activating each of the phases as described herein to provide zero current switching on each of the phases. In such an instance, the controller circuitry 140 produces and applies a respective adjustment value to each phase because none of them may operate at their natural frequency. Thus, in this latter case, there is no real master phase, the ON times of all the phases are adjusted so that zero current switching occurs in each of the phases.

Figure 9:
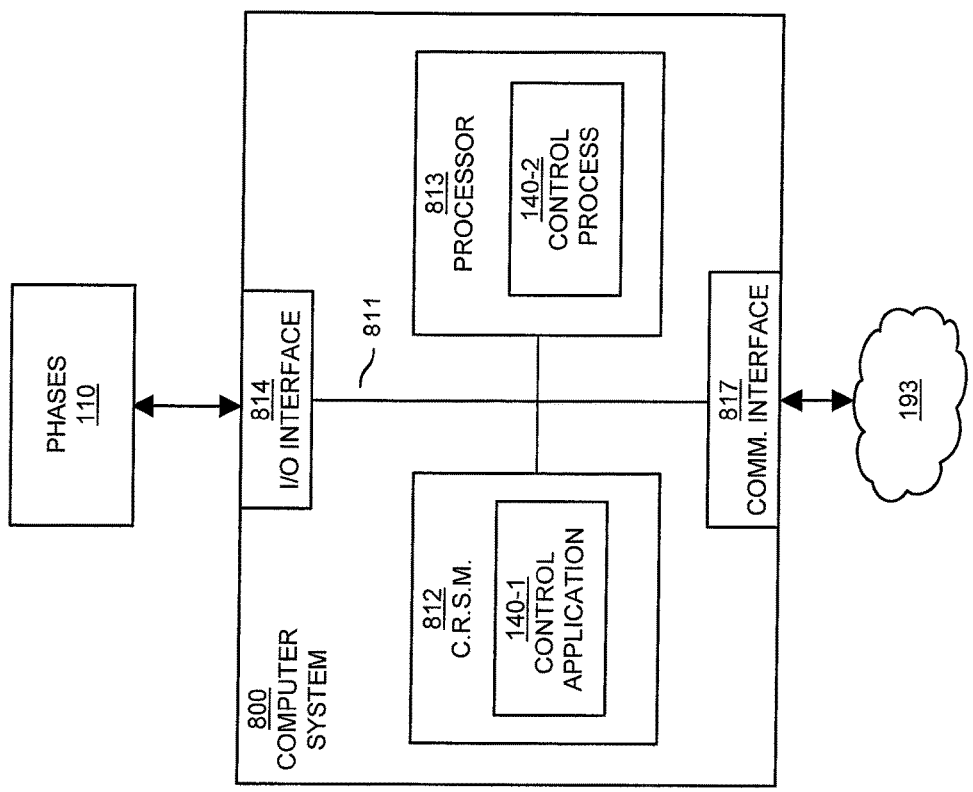
FIG. 9 is an example diagram illustrating computer processor hardware and related software instructions to execute methods according to embodiments herein.

FIG. 9 is an example block diagram of a computer device for implementing any of the operations as discussed herein according to embodiments herein.

As shown, computer system 800 (such as implemented by power converter circuit 100) of the present example includes an interconnect 811 that couples computer readable storage media 812 such as a non-transitory type of media (i.e., any type of hardware storage medium) in which digital information can be stored and retrieved, a processor 813 (e.g., computer processor hardware such as one or more processor devices), I/O interface 814, and a communications interface 817.

I/O interface 814 provides connectivity to any suitable circuitry such as each of phases 110.

Computer readable storage medium 812 can be any hardware storage resource or device such as memory, optical storage, hard drive, floppy disk, etc. In one embodiment, the computer readable storage medium 812 stores instructions and/or data used by the control application 140-1 to perform any of the operations as described herein.

Further in this example embodiment, communications interface 817 enables the computer system 800 and processor 813 to communicate over a resource such as network 193 to retrieve information from remote sources and communicate with other computers.

As shown, computer readable storage media 812 is encoded with control application 140-1 (e.g., software, firmware, etc.) executed by processor 813. Control application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in control application 140-1 stored on computer readable storage medium 812.

Execution of the control application 140-1 produces processing functionality such as control process 140-2 in processor 813. In other words, the control process 140-2 associated with processor 813 represents one or more aspects of executing control application 140-1 within or upon the processor 813 in the computer system 150.

In accordance with different embodiments, note that computer system may be a micro-controller device configured to control a power supply and perform any of the operations as described herein.

Functionality supported by the different resources will now be discussed via flowcharts in FIG. 10. Note that the steps in the flowcharts below can be executed in any suitable order.

Figure 10:
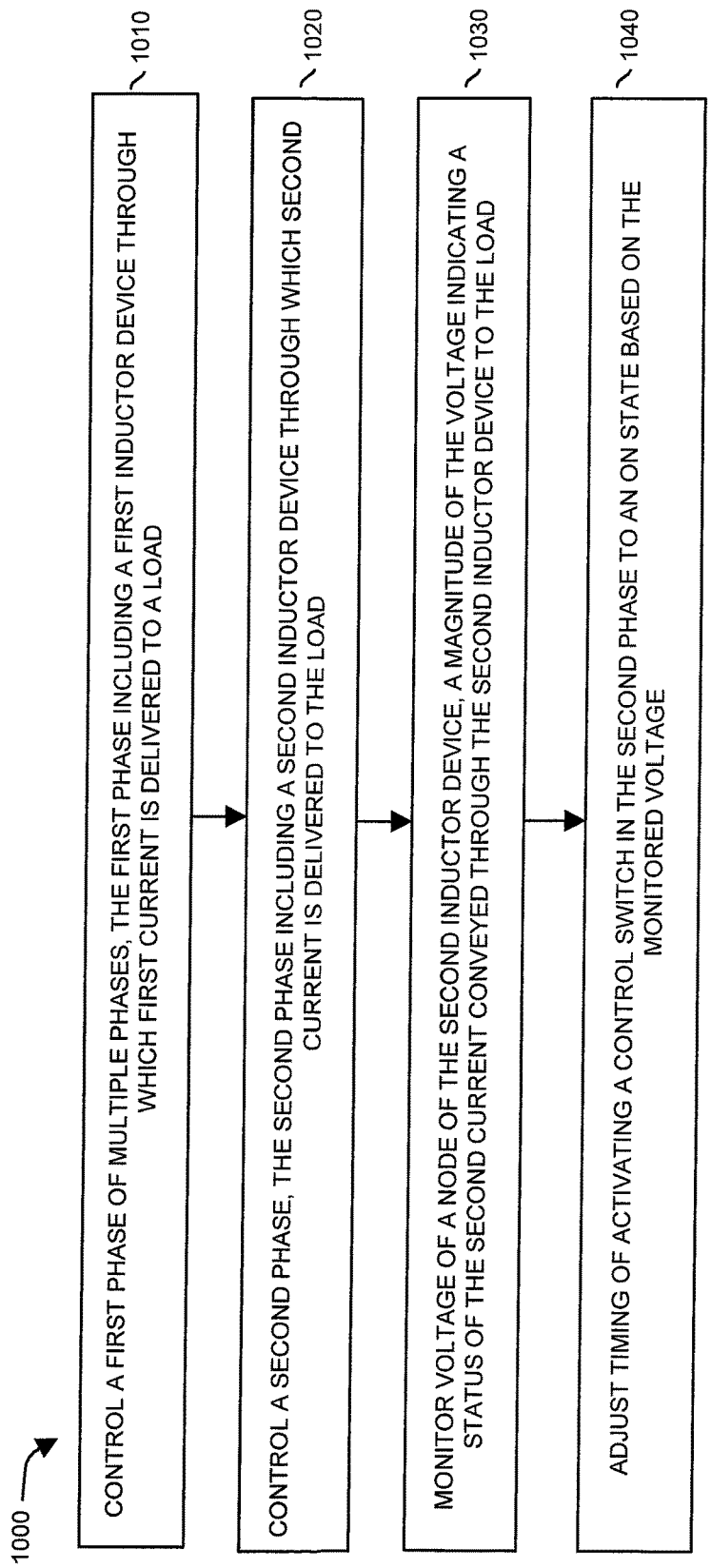
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the controller circuitry 140 controls a first phase 110-1 (such as a master phase) of multiple phases 110 in the power converter circuit 100. The first phase 110-1 includes a first inductor device 236-1 through which first current IS1 is delivered to power a load 118.

In processing operation 1020, the controller circuitry 140 controls a second phase 110-2; the second phase (slave phase dependent on the master phase) includes a second inductor device 236-2 through which second current IS2 is delivered to power the load 118. As previously discussed, the controller circuitry 140 can be configured to evenly space activation of the phases to reduce a ripple voltage produced on the output voltage 190.

In processing operation 1030, the monitor circuitry 150 monitors an attribute such as a magnitude of voltage on a node 260-2 of the second inductor device 236-2. In one embodiment, the magnitude of the voltage indicates a status of the second current conveyed through the second inductor device to the load 118.

In processing operation 1040, the controller circuitry 140 adjusts timing of activating a control switch 232-2 in the second phase 110-2 to an ON state based at least in part on the monitored voltage.

Note again that techniques herein are well suited for use in power converter circuit applications such as those that include semi-resonant DC-DC phases. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

FURTHER SUMMARY AND PERMUTATIONS OF EMBODIMENTS

Clause 1. A multi-phase power supply circuit comprising:
a first phase, the first phase including a first inductor device through which first current is delivered to a load;
a second phase, the second phase including a second inductor device through which second current is delivered to the load;
a monitor circuit operable to monitor a node of the second inductor device to detect a status of the second current conveyed through the second inductor device to the load; and
control circuitry operable to adjust timing of activating a control switch in the second phase to an ON state based on the monitored node.

Clause 2. The multi-phase power supply circuit as in any of clauses 1-15, wherein the control circuitry is further operable to adjust the timing of activating the control switch in the second phase to synchronize the second current with respect to the first current to power the load.

Clause 3. The multi-phase power supply circuit as in any of clauses 1-15, wherein the control circuitry is further operable to adjust timing of an edge of a control signal controlling activation of the control switch to synchronize the second current with respect to the first current to power the load.

Clause 4. The multi-phase power supply circuit as in any of clauses 1-15, wherein the control circuitry is further operable to adjust multiple edges of a control signal controlling activation of the control switch to synchronize the second current with respect to the first current to power the load.

Clause 5. The multi-phase power supply circuit as in any of clauses 1-15, wherein the second inductor device is a tapped inductor device; and
wherein the control circuitry is operable to adjust the timing of the edge of the control signal to achieve zero current switching in the second phase.

Clause 6. The multi-phase power supply circuit as in any of clauses 1-15, wherein the monitor circuit is operable to monitor a tapped node of the tapped inductor to produce an adjustment value to adjust subsequent timing of an activation pulse in the control pulse.

Clause 7. The multi-phase power supply circuit as in any of clauses 1-15, wherein the second inductor device is a tapped inductor;
wherein the node is a tapped node of the tapped inductor, the apparatus further comprising:
a switch device operable to selectively couple the tap node to a reference voltage.

Clause 8. The multi-phase power supply circuit as in any of clauses 1-15, wherein the switch device is a synchronous switch in the second phase; and
wherein the monitor circuit is further operable to monitor a magnitude of the voltage of the tapped node to determine timing of peak current passing through the synchronous switch when the synchronous switch of the second phase is activated.

Clause 9. The multi-phase power supply circuit as in any of clauses 1-15, wherein the switch device is a synchronous switch in the second phase; and
wherein the monitor circuit is further operable to monitor the magnitude of the voltage of the tapped node to determine timing of zero current passing through the synchronous switch when the synchronous switch of the second phase is activated.

Clause 10. The multi-phase power supply circuit as in any of clauses 1-15, wherein adjustments to the timing of activating a control switch in the second phase to an ON state results in reactivation of the control switch at an end of a control cycle when current through a synchronous switch in the second phase is zero.

Clause 11. The multi-phase power supply circuit as in any of clauses 1-15, wherein the first phase and the second phase operate at different resonant frequencies, the adjustment to timing of activating the control switch offsetting a period of controlling the second phase to a period of controlling the first phase.

Clause 12. The multi-phase power supply circuit as in any of clauses 1-15, wherein adjustment to the timing of activating the control switch in the second phase results in zero current switching of the second phase in which the control switch in the second phase is reactivated at a time when zero current passes through a respective synchronous switch of the second phase to the load.

Clause 13-1. The multi-phase power supply circuit as in any of clauses 1-15, wherein adjustment to the timing of activating the control switch in the second phase accounts for circuit component variations between the first phase and the second phase.

Clause 13-2: The multi-phase power supply circuit as in any of clauses 1-15, wherein the controller circuitry is further operable to synchronize the different phases by summing the latest ON time of phase 1 (deemed master phase) and its filtered off time, and predicting when the pulses for other phase 2, 3 . . . N should start. For example, in a 3 phase system, the pulses of phase 2 and phase 3 can be started at T/3 and 2T/3 delayed from the start pulse of phase 1, where T is the sum of the latest ON time and filtered OFF time of phase 1.

Clause 14. The multi-phase power supply circuit as in any of clauses 1-15, wherein the monitor circuit is further operable to:
produce an adjustment value based on the monitored voltage, the adjustment value being a timing value in which to modify the timing of activating the control switch in the second phase in a subsequent control cycle; and
store the adjustment value for later retrieval.

Clause 15. The multi-phase power supply circuit as in any of clauses 1-15, wherein the control circuitry is further operable to:
produce period information associated with controlling activation of the first phase; and
utilize the period information of the first phase to control timing of activating the control switch in the second phase.

Clause 16. A method of controlling multiple phases to produce an output voltage to power a load, the method comprising:
controlling a first phase of the multiple phases, the first phase including a first inductor device through which first current is delivered to a load;
controlling a second phase, the second phase including a second inductor device through which second current is delivered to the load;
monitoring voltage of a node of the second inductor device, a magnitude of the voltage indicating a status of the second current conveyed through the second inductor device to the load; and
adjusting timing of activating a control switch in the second phase to an ON state based on the monitored voltage.

Clause 17. The method as in any of clauses 16-30 further comprising:
adjusting the timing of activating the control switch in the second phase to synchronize the second current with respect to the first current to power the load.

Clause 18. The method as in any of clauses 16-30 further comprising:
adjusting timing of an edge of a control signal controlling activation of the control switch to synchronize the second current with respect to the first current to power the load.

Clause 19. The method as in any of clauses 16-30 further comprising:
adjusting multiple edges of a control signal controlling activation of the control switch to synchronize the second current with respect to the first current to power the load.

Clause 20. The method as in any of clauses 16-30 further comprising:
adjusting the timing of the edge of the control signal to achieve zero current switching in the second phase.

Clause 21. The method as in any of clauses 16-30, wherein the second inductor device is a tapped inductor, the method further comprising:
monitoring a tapped node of the tapped inductor to produce an adjustment value to adjust subsequent timing of an activation pulse in the control signal.

Clause 22. The method as in any of clauses 16-30, wherein the second inductor device is a tapped inductor; and
wherein the node is a tapped node of the tapped inductor, the method further comprising: selectively coupling the tapped node to a reference voltage.

Clause 23. The method as in any of clauses 16-30, wherein the switch device is a synchronous switch in the second phase; and
the method further comprising: monitoring a magnitude of the voltage of the tapped node to determine timing of peak current passing through the synchronous switch when the synchronous switch of the second phase is activated.

Clause 24. The method as in any of clauses 16-30, wherein the switch device is a synchronous switch in the second phase; and
the method further comprising: monitoring the magnitude of the voltage of the tapped node to determine timing of zero current passing through the synchronous switch when the synchronous switch of the second phase is activated.

Clause 25. The method as in any of clauses 16-30 further comprising:

applying adjustments to the timing of activating a control switch in the second phase to an ON state, the application of adjustments resulting in reactivation of the control switch at an end of a control cycle when current through a synchronous switch in the second phase is zero.

Clause 26. The method as in any of clauses 16-30, wherein the first phase and the second phase operate at different resonant frequencies, the adjustment to timing of activating the control switch operable to offset a period of controlling the second phase with respect to a period of controlling the first phase.

Clause 27. The method as in any of clauses 16-30, wherein adjustment to the timing of activating the control switch in the second phase results in zero current switching of the second phase in which the control switch in the second phase is reactivated at a time when current zero passes through a respective synchronous switch of the second phase to the load.

Clause 28. The method as in any of clauses 16-30 further comprising:

applying adjustments to the timing of activating the control switch in the second phase, the adjustments accounting for circuit component variations between the first phase and the second phase.

Clause 29. The method as in any of clauses 16-30 further comprising:

producing an adjustment value based on the monitored voltage, the adjustment value being a timing value in which to modify the timing of activating the control switch in the second phase in a subsequent control cycle; and storing the adjustment value for later retrieval.

Clause 30. The method as in any of clauses 16-30 further comprising:

producing period information associated with controlling activation of the first phase; and utilizing the period information of the first phase to control timing of activating the control switch in the second phase.

Clause 31. Computer-readable storage media having instructions stored thereon for processing data information, such that the instructions, when carried out by computer processor hardware, cause the computer processor hardware to:

control a first phase of multiple phases in a power converter circuit, the first phase including a first inductor device through which first current is delivered to a load;

control a second phase, the second phase including a second inductor device through which second current is delivered to the load;

monitor voltage of a node of the second inductor device, a magnitude of the voltage indicating a status of the second current conveyed through the second inductor device to the load; and adjust timing of activating a control switch in the second phase to an ON state based on the monitored voltage.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A multi-phase power supply circuit comprising:
a first phase, the first phase including a first inductor device through which first current is delivered to a load;
a second phase, the second phase including a second inductor device through which second current is delivered to the load;
a monitor circuit operable to monitor a magnitude of the second current conveyed through the second inductor device to the load; and
control circuitry operable to produce an adjustment to a timing of activating respective control switch circuitry in the second phase to an ON state based on the monitored second current, the adjustment to the timing of activating the control switch circuitry in the second phase resulting in zero current switching in the second phase.

2. The multi-phase power supply circuit as in claim 1, wherein the control circuitry is further operable to adjust the timing of activating the respective control switch circuitry in the second phase to synchronize the second current with respect to the first current to power the load.

3. The multi-phase power supply circuit as in claim 1, wherein the adjustment is further operable to delay or advance timing of an edge of a control signal controlling activation of the respective control switch circuitry to achieve the zero current switching in the second phase.

4. The multi-phase power supply circuit as in claim 3, wherein the second inductor device is a tapped inductor device; and
wherein the control circuitry is operable to adjust the timing of the edge of the control signal to achieve zero current switching in the second phase.

5. The multi-phase power supply circuit as in claim 4, wherein the monitor circuit is operable to monitor a tapped node of the second inductor device to monitor the second current and produce the adjustment to the timing of activating respective control switch circuitry in the second phase.

6. The multi-phase power supply circuit as in claim 1, wherein the control circuitry is further operable to, via the adjustment, adjust multiple edges of a control signal controlling activation of the respective control switch circuitry switch.

7. The multi-phase power supply circuit as in claim 1, wherein the second inductor device is a tapped inductor;
wherein the monitor circuit is operable to monitor a tapped node of the second inductor device to monitor the second current, the apparatus further comprising:
a switch device operable to selectively couple the tapped node to a reference voltage.

8. The multi-phase power supply circuit as in claim 7, wherein the switch device is synchronous switch circuitry in the second phase; and
wherein the monitor circuit is further operable to monitor a magnitude of a voltage of the tapped node to determine timing of peak current passing through the synchronous switch circuitry when the synchronous switch circuitry of the second phase is activated.

9. The multi-phase power supply circuit as in claim 7, wherein the switch device is synchronous switch circuitry in the second phase; and
wherein the monitor circuit is further operable to monitor a magnitude of voltage of the tapped node to determine timing of zero current passing through the synchronous switch circuitry when the synchronous switch circuitry of the second phase is activated.

10. The multi-phase power supply circuit as in claim 1, wherein the adjustment to the timing of activating the control switch circuitry in the second phase to the ON state results in reactivation of the control switch circuitry at an end of a control cycle when current through synchronous switch circuitry in the second phase is zero.

11. The multi-phase power supply circuit as in claim 1, wherein the first phase and the second phase operate at different resonant frequencies, the adjustment to timing of activating the control switch circuitry modifying a duration of activating the control switch circuitry in the second phase and offsetting a period of controlling the second phase with respect to a period of controlling the first phase to achieve the zero current switching in the second phase.

12. The multi-phase power supply circuit as in claim 1, wherein the adjustment to the timing is operable to reactivate the respective control switch circuitry in the second phase at a subsequent time in which substantially zero current passes through respective synchronous switch circuitry of the second phase to the load.

13. The multi-phase power supply circuit as in claim 1, wherein the adjustment to the timing of activating the respective control switch circuitry in the second phase accounts for circuit component variations between the first phase and the second phase.

14. The multi-phase power supply circuit as in claim 1, wherein the monitor circuit is further operable to:
produce a timing adjustment value based on the monitored second current, the timing adjustment value being a timing value in which to modify the timing of activating the respective control switch circuitry in the second phase in a subsequent control cycle; and
store the adjustment value for later retrieval.

15. The multi-phase power supply circuit as in claim 1, wherein the respective control circuitry is further operable to:
produce period information associated with controlling activation of the first phase; and
utilize the period information of the first phase to control the timing of activating the respective control switch circuitry in the second phase.

16. The multi-phase power supply circuit as in claim 1, wherein the controller circuitry is further operable to:
sum an ON time of the first phase and OFF time over multiple cycles to produce a period value; and
divide the period value by a number of phases in the multi-phase power supply to produce phase start times; and
use the phase start times to activate each of the phases in the multi-phase power supply at different times in a control cycle.

17. The multi-phase power supply circuit as in claim 1, wherein the controller circuitry is operable to produce a period value based on an average period of cycling each of the multiple phases in the multi-phase power supply, the controller circuitry further operable to synchronize the multiple phases by dividing the average period value by the number of phases in the multi-phase power supply to produce phase start times, and using the phase start times to activate each of the multiple phases at different times in a control cycle.

18. The multi-phase power supply circuit as in claim 1, wherein the control circuitry sets a switching period of controlling the second phase to be equal to a switching period of controlling activation of the first phase.

19. The multi-phase power supply as in claim 18, wherein the adjustment produced by the control circuitry modifies a duration of activating the control switch circuitry to the ON state in the second phase to achieve a condition of zero current flowing though the second inductor device at an end of the switching period of controlling the second phase.

20. The multi-phase power supply circuit as in claim 19, wherein the first phase and the second phase operate at different resonant frequencies.

21. The multi-phase power supply circuit as in claim 1, wherein the adjustment to timing of activating the control switch circuitry operable to modify a duration of activating the control switch circuitry to the ON state to achieve the zero current switching in the second phase.

22. The multi-phase power supply circuit as in claim 21, wherein the control circuitry is operable to modify the duration of activating the control switch circuitry to the ON state in the second phase based on feedback of current through the second inductor device on a prior switching cycle of controlling the second phase.

23. The multi-phase power supply as in claim 21, wherein modification of the duration changes the magnitude of the second current delivered through the second inductor device on a subsequent switching cycle of controlling the second phase to achieve the zero current switching.

24. The multi-phase power supply circuit as in claim 23, wherein the first phase and the second phase operate at different resonant frequencies.

25. A method of controlling multiple phases to produce an output voltage to power a load, the method comprising:
controlling a first phase of the multiple phases, the first phase including a first inductor device through which first current is delivered to the load;
controlling a second phase of the multiple phases, the second phase including a second inductor device through which second current is delivered to the load;
monitoring a magnitude of the second current conveyed through the second inductor device to the load; and
producing an adjustment to a timing of activating a control switch in the second phase to an ON state based on the monitored magnitude of the second current, the adjustment to the timing of activating the control switch in the second phase resulting in zero current switching in the second phase.

26. The method as in claim 25 further comprising:
adjusting the timing of activating the control switch in the second phase to synchronize the second current with respect to the first current to power the load.

27. The method as in claim 25 further comprising:
adjusting timing of an edge of a control signal controlling activation of the control switch to achieve the zero current switching in the second phase.

28. The method as in claim 27 further comprising:
adjusting the timing of the edge of the control signal to achieve the zero current switching in the second phase.

29. The method as in claim 25 further comprising:
adjusting multiple edges of a control signal controlling activation of the control switch to achieve the zero current switching in the second phase.

30. The method as in claim 29, wherein the second inductor device is a tapped inductor, the method further comprising:
monitoring a tapped node of the tapped inductor to produce an adjustment value to adjust subsequent timing of an activation pulse in the control signal.

31. The method as in claim 25, wherein the second inductor device is a tapped inductor; and the method further comprising: selectively coupling a tapped node of the tapped inductor to a reference voltage to control generation of the second current.

32. The method as in claim 31 further comprising:
monitoring a magnitude of the voltage of the tapped node to determine timing of peak current passing through the second inductor device; and
utilizing the determined peak current to produce the adjustment to the timing of activating the control switch to achieve the zero current switching in the second phase.

33. The method as in claim 25 further comprising:
applying the adjustment to the timing of activating the control switch in the second phase to an ON state, the application of adjustment resulting in reactivation of the control switch at an end of a control cycle when current through a synchronous switch in the second phase is zero.

34. The method as in claim 25, wherein the first phase and the second phase operate at different resonant frequencies, the adjustment to timing of activating the control switch operable to offset a period of controlling the second phase with respect to a period of controlling the first phase.

35. The method as in claim 25 further comprising:
applying the adjustment to the timing of activating the control switch in the second phase, the adjustment accounting for circuit component variations between the first phase and the second phase to achieve the zero current switching in the second phase.

36. The method as in claim 25 further comprising:
producing an adjustment value based on the monitored magnitude of the second current, the adjustment value being a timing value in which to modify the timing of activating the control switch in the second phase in a subsequent control cycle; and
storing the adjustment value for later retrieval.

37. The method as in claim 25 further comprising:
producing period information associated with controlling activation of the first phase; and
utilizing the period information associated with the first phase to control timing of activating the control switch in the second phase.

38. Computer-readable storage media having instructions stored thereon for processing data information, such that the instructions, when carried out by computer processor hardware, cause the computer processor hardware to:
control a first phase of multiple phases in a power converter circuit, the first phase including a first inductor device through which first current is delivered to a load;
control a second phase of the multiple phases, the second phase including a second inductor device through which second current is delivered to the load;
monitor a magnitude of the second current conveyed through the second inductor device to the load; and
produce an adjustment to timing of activating a control switch in the second phase to an ON state based on the monitored magnitude of the second current, the adjustment to the timing of activating the control switch circuitry in the second phase resulting in zero current switching in the second phase.

* * * * *